United States Patent

Besnard

[15] 3,659,309
[45] May 2, 1972

[54] MEANS FOR ATTACHING THE ARM OF A WINDSHIELD WIPER TO THE BLADE SUPPORT THEREOF

[72] Inventor: Marcel Besnard, Romainville, France

[73] Assignee: Societe Anonyme Pour L'Equipement Electrique des Vehicules S.E.V. Marchal

[22] Filed: Sept. 8, 1970

[21] Appl. No.: 70,079

Related U.S. Application Data

[62] Division of Ser. No. 795,261, Jan. 30, 1969, Pat. No. 3,596,044.

[52] U.S. Cl. ............................................. 15/250.32, 287/92
[51] Int. Cl. ............................................................ A47l 1/00
[58] Field of Search ................... 15/250.31, 250.32, 250.33; 287/92; 16/171

[56] References Cited

UNITED STATES PATENTS

| 2,404,523 | 7/1946 | Nesson | 15/250.32 |
| 2,933,016 | 4/1960 | Kunde et al. | 16/171 X |
| 2,506,777 | 10/1936 | Evans | 15/250.33 |
| 3,254,358 | 6/1966 | Wise | 15/250.32 |
| 2,811,349 | 10/1957 | Bondurant et al. | 287/92 X |

FOREIGN PATENTS OR APPLICATIONS

| 1,190,348 | 4/1965 | Germany | 15/250.32 |
| 1,100,069 | 1/1968 | Great Britain | 15/250.32 |
| 920,059 | 3/1963 | Great Britain | 15/250.32 |
| 44,399 | 7/1956 | Germany | 15/250.32 |

*Primary Examiner*—Andrew V. Kundrat
*Attorney*—Holcombe, Wetherill & Brisebois

[57] ABSTRACT

Means for attaching a windshield wiper arm to a wiper blade support, said means comprising a male member provided with a cylindrical element having two diametrically opposed flattened surface areas, and a female member having a slot therein equal in width to the diametral distance between said flattened areas which terminates in a circular seat having a radius equal to that of said cylindrical member, one of said members being made of a plastic material and fastened to said blade support.

4 Claims, 4 Drawing Figures

PATENTED MAY 2 1972 3,659,309

MEANS FOR ATTACHING THE ARM OF A WINDSHIELD WIPER TO THE BLADE SUPPORT THEREOF

This application is a division of my prior application Ser. No. 795,261, filed Jan. 30, 1969, and now U.S. Pat. No. 3,576,044.

SUMMARY OF THE INVENTION

Windshield wipers for automobiles are driven by windshield wiper arms which are attached to the blade support of the windshield wiper by means of a bracket. In general, this bracket is a separate member attached to the blade support of the windshield wiper. It is the object of the present invention to provide a simple device which makes it unnecessary to attach a bracket to the blade support of the windshield wiper, while nevertheless providing means for fastening the windshield wiper arm firmly to the associated blade support.

The present invention is accordingly directed to the new article of manufacture which comprises an assembly formed by the arm of a windshield wiper and the associated blade support, which assembly is characterized by the fact that the means for fastening the arm to the blade support comprises, on the one hand, a male member comprising at least one cylindrical member, on which two diametrically opposed flat spots are provided, and on the other hand, a female member formed with at least one cylindrical recess of the same diameter as the cylindrical male member. This cylindrical recess is connected to the outside by a groove having a length equal to the distance between the two flattened spots on the cylindrical male member.

In a first embodiment of the invention the cylindrical recesses in the female member are in the windshield wiper arm and the male member is carried by the blade support of the windshield wiper. In this case the male member may be a member inserted into the blade support, which member is attached to said blade support by means of a rivet. This member is preferably made of a plastic material such as that sold under the trademark DELRIN, and comprises two parallelopipedic plates connected together by a cylindrical member provided with flattened areas. The assembly is pierced in alignment with the said cylindrical member to permit the passage of the rivet used to fasten the insert in the blade support.

In a modification of the first embodiment, the arm of the windshield wiper carries near the recesses in the female part of the pivotal mounting, between these recesses and the control means for the arm, guide means on opposite sides of the arm, which cooperate with the lateral edges of the blade support of the windshield wiper.

In a second embodiment of the invention the male member is the windshield wiper arm, which carries, on each side and near its end, two cylindrical bosses provided with diametrically opposed flattened areas. The female member is the blade support of the windshield wiper and the recesses in this female member which cooperate with said bosses are formed in an insert which is riveted to the blade support. The insert has the shape of a parallelopiped provided with a central hole through which the wiper arm passes. On opposite sides of this hole are grooves which open into semicircular seats. The diameter of each seat is substantially equal to the diameter of the cylindrical projections on the male member. The width of the slots is substantially equal to the distance between the flattened areas on each of the cylindrical projections on the male member.

In order that the invention may be better understood, two embodiments thereof will now be described, purely by way of example with reference to the accompanying drawings, in which.

Figure 1:
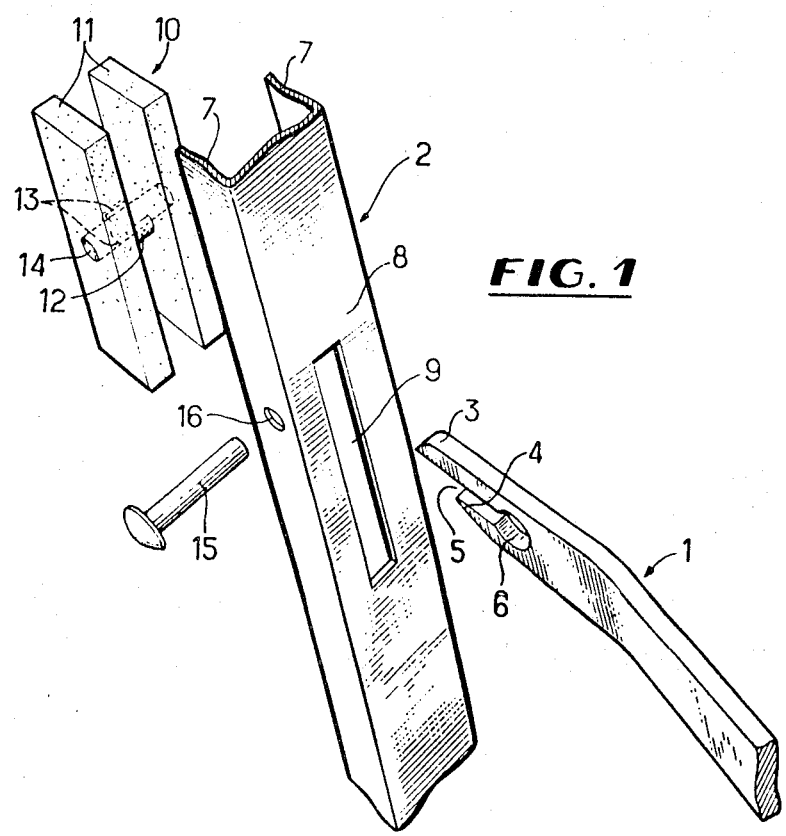
FIG. 1 shows in perspective the various components of the assembly according to the invention, in the embodiment in which the female member is the windshield wiper arm.

Referring now to the drawings, it will be seen that reference numeral 1 designates the windshield wiper arm as a whole, while 2 indicates the wiper blade support which is connected to said arm.

Figure 2:
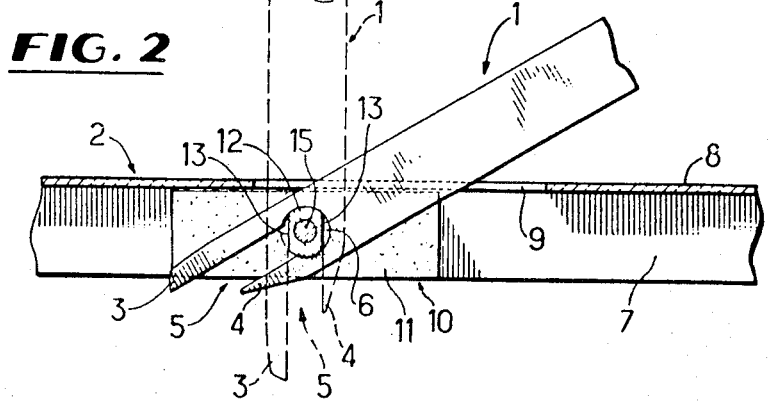
FIG. 2 shows in section the mounting of the windshield wiper arm of FIG. 1 on the associated wiper blade support.

Considering first the embodiment shown on FIGS. 1 and 2, it will be noted that the wiper arm 1 is provided, at the end which is to be connected to the wiper blade support, with two projections 3 and 4, with 3 being longer than 4. Between the projections 3 and 4 is a slot 5 which separates the two projections and opens into a circular hole 6, the center of which is in alignment with the axis of the slot 5, which is the same as that of the wiper arm.

The wiper blade support 2 is of a conventional type and consists of a U-shaped channel member to which the blade support of the windshield wiper is attached. This channel member has two sidewalls 7 and a bottom 8, which connects the two sidewalls. There is a rectangular hole 9 in the bottom near the place at which the arm of the wiper is to be attached to the blade support. This hole is a little wider than the arm 1 is thick.

Inside the channel member which constitutes the blade support is an insert 10 made of a plastic material such as that sold under the trademark DELRIN. This insert 10 consists of two lateral rectangular plates positioned face to face and connected at their centers by a cylindrical member 12. The cylindrical member 12 has two flattened areas 13 diametrically opposite each other. The diameter of the member 12 is substantially equal to that of the hole 6. The diametral distance between the flat areas 13 is equal to the width of the slot 5 between the projections 3 and 4 of the arm 1. The member 10 is positioned inside the channel member which constitutes the blade support 2. The rectangular plates 11 are not quite as high as the sidewalls 7 of the channel member so that they do not project out of the channel member when the member 10 is put in place. The member 10 is pierced, from side to side through its center, by a cylindrical hole 11, which extends through the two sidewalls 11 and the member 12.

The insert 10 is fastened to the blade support 2 by means of a rivet 15, which is inserted through the holes 16 in the sidewalls 7 of the blade support and the hole 14 in the insert 10. The holes 16 are in the same section of the blade support as the hole 9, and are near one of the ends of this hole.

When the arm 1 has been attached to the blade support 2 carrying the insert 10 fastened thereto by the rivet 15, the end of the wiper arm carrying the projections 3 and 4 is introduced into the hole 9, so that the arm is substantially perpendicular to the bottom 8 of the blade support. This position is shown in phantom lines on FIG. 2. During this step the wiper arm slides over the flattened areas 13 of the member 12, with the projections 3 and 4 embracing the two flattened areas. When, in the course of this step, the member 12 reaches the bottom of the cylindrical seat 6, the wiper arm 1 is swung obliquely. This is made possible by the cylindrical shape of the member 12, the diameter of which is substantially the same as that of the seat 6. This swinging motion is away from the side of the longer projection 3, so that when this oblique position is attained the projection 3 is nearer the bottom 8 of the blade support 2. When the wiper arm 1 is thus obliquely positioned, as it is in use, it is locked to the member 12 of the insert 10 because the member 12 has a diameter too great to pass through the slot 5 unless the longitudinal axis of this slot is parallel to the plane of the flattened areas 13, which occurs only when the wiper arm is vertical as it was when being attached to the blade support.

It should be noted that the device which has just been described is easy to make, and very inexpensive. Moreover, it provides a perfect connection between the arm and the blade support, which connection generates no noise during operation of the wiper due to the presence of the plastic insert 10.

Figure 3:
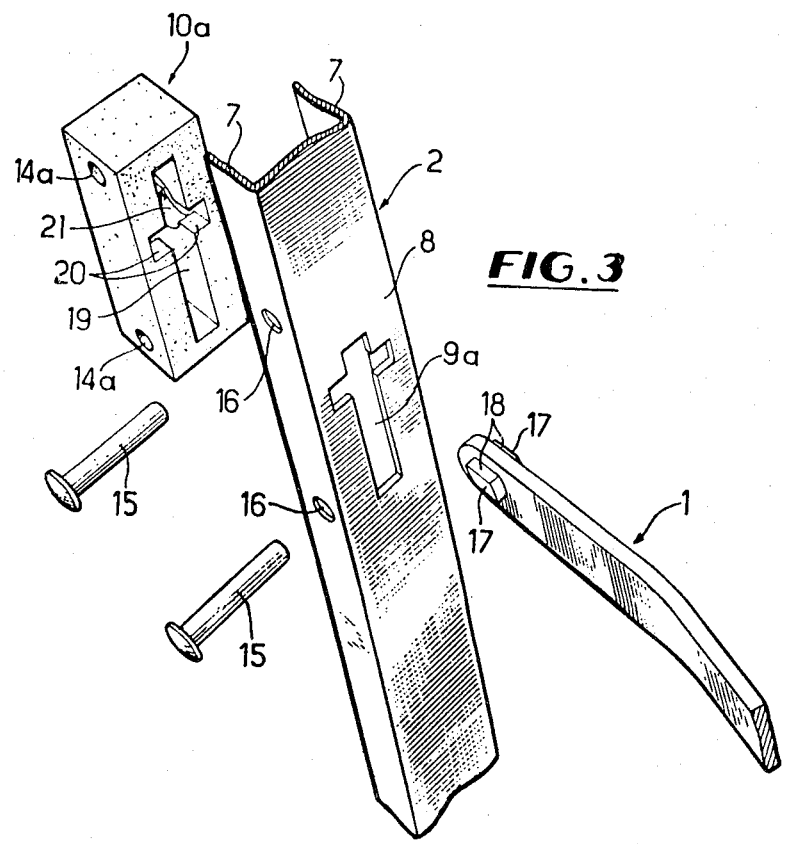
FIG. 3 shows in perspective the different components of the assembly according to the invention in the embodiment in which the windshield wiper arm is the male member.
Figure 4:
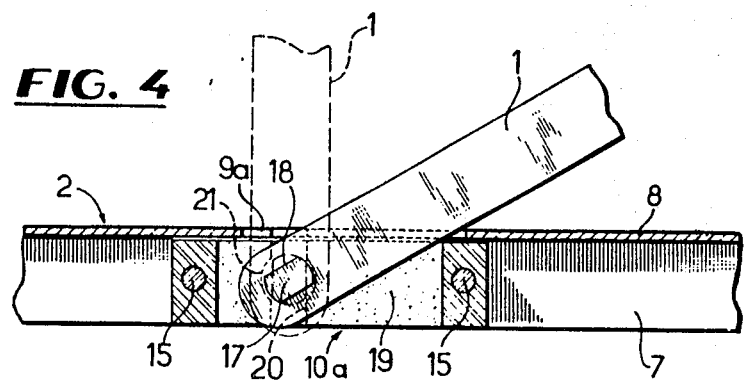
FIG. 4 shows in section the device of FIG. 3 with the windshield wiper arm in place on the associated blade support.

In the embodiment shown in FIGS. 3 and 4, the male part of the assembly is the wiper arm 1 and the female part is the blade support 2.

The wiper arm carries on each side of one end a projection 17 in the form of a cylinder having two diametrically opposed flattened areas 18.

The blade support 2 is made, as in the first embodiment, from a U-shaped channel member having two sidewalls 7 and a bottom 8. A cruciform hole 9a is cut into the bottom 8. One of its branches extends longitudinally of the bottom 8 and is rectangular in shape, and the other branch is perpendicular thereto. Its width is equal to the distance between the two flattened areas 18 on a given projection 17, and its length in a direction perpendicular to the longitudinal axis of the bottom 8, is sufficient to permit the passage of that portion of the wiper arm which carries the two projections 17.

Inside the blade support 2 is an insert 10a, the shape of which is that of a parallelopiped. This insert is made of a plastic material such as that sold under the trademark DELRIN. The width of the insert 10a is substantially equal to that of the blade support, and its height is substantially equal to that of the sidewalls 7. The insert 10a is introduced into the blade support 2, to which it is fastened by means of two rivets 15 which pass through holes 14a in the ends of the insert 10a and holes 16 in the sidewalls 7 of the blade support. One of the holes 16 is near one of the ends of the longitudinal branch of the hole 9a. The other hole 16 is near the other end of the same branch, but in a section of the blade support beyond the end of the hole 9a.

A rectangular hole 19 extends from top to bottom through the central part of the insert 10a, perpendicularly with respect to the bottom 8 of the blade support. This hole runs longitudinally of the insert. In each of the two opposed lateral faces of the hole 19 is a recess made up of a vertical slot 20 extending all the way through the insert 10a and of a cylindrical seat 21, the center of which lies on the axis of the slot 20, midway of said slot. The diameter of the seat 21 is substantially equal to the diameter of the projections 17. The depth of each seat is substantially equal to the depth of the grooves 20. The width of the grooves 20 is substantially equal to the distance between the two flattened areas on a given projection 17. When the insert 10a is introduced into the blade support 2, the slot 20 is placed in registration with the transverse branch of the cruciform hole 9a.

When the wiper arm is to be attached to the blade support, the arm is brought perpendicularly toward the bottom 8 of the blade support 2, so that the projections 17 are brought into registration with the transverse branch of the hole 9a and the slots 20. The arm is then introduced into the hole 19, with the flattened areas 18 on the projections 17 sliding inside the slots 20 until these projections reach the cylindrical seats 21. This position is shown in phantom lines on FIG. 4. The arm of the wiper is then swung obliquely of the blade support in the direction permitted by the presence of the axial branch of the hole 9a which permits the arm to pass through the bottom 8. This oblique position is the operating position for the arm and blade holder. They are locked in this position because the cylindrical projection 17 cannot then come out through the slots 20 through which it was introduced.

The advantages of this modification are the same as those already set forth in connection with the first modification.

It will, of course, be appreciated that the embodiments which have been described have been given purely by way of illustration and may be modified as to detail without thereby departing from the basic principles of the invention.

What is claimed is:

1. Means for attaching a windshield wiper arm having parallel sidewalls to a wiper blade support, said means comprising a male member including two parallelopipeds connected by a cylindrical element having two diametrically opposed flattened surface areas, and a female member having at least one slot therein equal in width to the diametral distance between said flattened areas which slot terminates in a circular seat having a radius equal to that of said cylindrical element, said male member being made of a synthetic plastic material and fastened to said blade support by means of a fastener extending through the sidewalls of said wiper arm and said member of plastic material.

2. Attaching means as claimed in claim 1 in which said fastener extends axially through said cylindrical part.

3. Means for attaching a windshield wiper arm having parallel sidewalls to a wiper blade support, said means comprising a male member carried by said wiper arm near one end thereof and constituted by two cylindrical projections having opposed flattened surfaces, and a female member having at least one slot therein equal in width to the diametral distance between said flattened areas which slot terminates in a circular seat having a radius equal to that of said cylindrical projections, said female member being made of a synthetic plastic material and fastened to said blade support by means of a fastener extending through the sidewalls of said wiper arm and said member of plastic material.

4. Attaching means as claimed in claim 3 in which said insert is a parallelopiped provided with a central hole which receives said one end of said wiper arm and is flanked by two slots leading to seats for said projections.

* * * * *